United States Patent
Rami Koujan et al.

(10) Patent No.: US 12,499,638 B2
(45) Date of Patent: Dec. 16, 2025

(54) STYLIZING A WHOLE-BODY OF A PERSON

(71) Applicant: Snap Inc., Santa Monica, CA (US)

(72) Inventors: Mohammad Rami Koujan, London (GB); Iason Kokkinos, London (GB)

(73) Assignee: SNAP INC., Santa Monica, CA (US)

( * ) Notice: Subject to any disclaimer, the term of this patent is extended or adjusted under 35 U.S.C. 154(b) by 67 days.

(21) Appl. No.: 17/967,230

(22) Filed: Oct. 17, 2022

(65) Prior Publication Data

US 2024/0127563 A1 Apr. 18, 2024

(51) Int. Cl.
*G06T 19/20* (2011.01)
*G06T 7/11* (2017.01)
*G06T 17/20* (2006.01)

(52) U.S. Cl.
CPC ........... *G06T 19/20* (2013.01); *G06T 7/11* (2017.01); *G06T 17/20* (2013.01); *G06T 2200/24* (2013.01); *G06T 2207/10016* (2013.01); *G06T 2207/20021* (2013.01); *G06T 2207/20081* (2013.01); *G06T 2207/20084* (2013.01);
(Continued)

(58) Field of Classification Search
CPC . G06T 19/20; G06T 7/11; G06T 17/20; G06T 2200/24; G06T 2207/10016; G06T 2207/20021; G06T 2207/20081; G06T 2207/20084; G06T 2207/30196; G06T 2219/024; G06T 2219/2024
See application file for complete search history.

(56) References Cited

U.S. PATENT DOCUMENTS

| 5,604,843 A | 2/1997 | Shaw et al. |
| 5,689,559 A | 11/1997 | Park |
| 5,880,731 A | 3/1999 | Liles et al. |

(Continued)

FOREIGN PATENT DOCUMENTS

| CN | 109863532 | 6/2019 |
| CN | 110168478 | 8/2019 |

(Continued)

OTHER PUBLICATIONS

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.
(Continued)

*Primary Examiner* — Sarah Lhymn
(74) *Attorney, Agent, or Firm* — SCHWEGMAN LUNDBERG & WOESSNER, P.A.

(57) ABSTRACT

Methods and systems are disclosed for performing real-time stylizing operations. The system receives an image that includes a depiction of a whole body of a real-world person. The system applies a machine learning model to the image to generate a stylized version of the whole body of the real-world person corresponding to a given style, the machine learning model being trained using training data to establish a relationship between a plurality of training images depicting synthetically rendered whole bodies of persons and corresponding ground-truth stylized versions of the whole bodies of the persons of the given style. The system replaces the depiction of the whole body of the real-world person in the image with the generated stylized version of the whole body of the real-world person.

20 Claims, 11 Drawing Sheets

(52) U.S. Cl.
CPC ............. *G06T 2207/30196* (2013.01); *G06T 2219/024* (2013.01); *G06T 2219/2024* (2013.01)

(56) References Cited

U.S. PATENT DOCUMENTS

| | | | |
|---|---|---|---|
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Del |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,195,056 B2 * | 12/2021 | Malaescu ................. G06N 3/08 |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,284,144 B2 | 3/2022 | Kotsopoulos et al. |
| 11,861,243 B1 * | 1/2024 | Li .......................... G06F 3/1254 |
| 11,869,170 B2 * | 1/2024 | Berthelot ............... G06T 3/4046 |
| 12,020,364 B1 * | 6/2024 | Orzan ....................... G06T 5/92 |
| 12,079,901 B2 * | 9/2024 | Xu .............................. G06T 5/77 |
| 12,079,936 B2 * | 9/2024 | Yang ...................... G06T 17/00 |

(56) References Cited

U.S. PATENT DOCUMENTS

| | | |
|---|---|---|
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van et al. |
| 2017/0310934 A1 | 10/2017 | Du et al. |
| 2017/0312634 A1 | 11/2017 | Ledoux et al. |
| 2018/0047200 A1 | 2/2018 | O'Hara et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0280997 A1 | 9/2019 | Baldwin et al. |
| 2019/0325264 A1* | 10/2019 | Keserich ............... G06F 18/214 |
| 2019/0340419 A1* | 11/2019 | Milman ................. G06N 20/00 |
| 2019/0370936 A1* | 12/2019 | Zhang ..................... G06T 3/40 |
| 2020/0151938 A1* | 5/2020 | Shechtman ........... G06N 3/045 |
| 2020/0160153 A1* | 5/2020 | Elmoznino ............ G06T 11/60 |
| 2020/0306637 A1 | 10/2020 | Baldwin et al. |
| 2020/0372127 A1 | 11/2020 | Denton et al. |
| 2020/0394413 A1* | 12/2020 | Bhanu .................. A63B 67/002 |
| 2020/0410575 A1 | 12/2020 | Grantham et al. |
| 2021/0049468 A1* | 2/2021 | Karras .................. G06V 40/168 |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0385180 A1 | 12/2021 | Al Majid et al. |
| 2021/0405831 A1 | 12/2021 | Mourkogiannis et al. |
| 2021/0407200 A1* | 12/2021 | Fu .............................. G06N 3/08 |
| 2021/0409535 A1 | 12/2021 | Mourkogiannis et al. |
| 2022/0004803 A1* | 1/2022 | Li .......................... G06T 19/006 |
| 2022/0012929 A1 | 1/2022 | Blackstock et al. |
| 2022/0076456 A1* | 3/2022 | Kim ......................... G06T 5/50 |
| 2022/0108542 A1* | 4/2022 | Zhang ....................... G06T 3/60 |
| 2022/0207355 A1 | 6/2022 | Demyanov et al. |
| 2022/0270265 A1 | 8/2022 | Dudovitch et al. |
| 2022/0284646 A1* | 9/2022 | Saha ...................... G06T 11/60 |
| 2022/0319127 A1 | 10/2022 | Tkachenko et al. |
| 2022/0327709 A1 | 10/2022 | Dudovitch et al. |
| 2022/0377257 A1* | 11/2022 | Wilson ..................... G06T 7/73 |
| 2023/0076809 A1* | 3/2023 | Chaudhary .......... A61B 6/5217 |
| 2023/0125014 A1* | 4/2023 | Kim ..................... G06T 11/001 |
| | | 382/157 |
| 2023/0130535 A1* | 4/2023 | Ma ......................... G06T 13/40 |
| | | 345/474 |
| 2023/0351566 A1* | 11/2023 | Jeon ..................... G06V 10/513 |
| 2024/0005574 A1* | 1/2024 | Zhang ....................... G06T 7/12 |
| 2024/0054466 A1* | 2/2024 | Li .............................. G06T 5/70 |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | 2024086534 | 4/2024 |

OTHER PUBLICATIONS

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji", Snapchat Support, [Online] Retrieved from the Internet: <URL: https://web.archive.org/web/20190503063620/https://support.snapchat.com/en-us/a/bitmoji>, (captured May 3, 2019), 2 pgs.

"Manage Your Bitmoji", Snapchat Support, [Online] Retrieved from the Internet: <URL: https://web.archive.org/web/20190503063620/https://support.snapchat.com/en-us/a/manage-bitmoji>, (captured May 3, 2019), 3 pgs.

"Bitmoji Family", Snapchat Support, [Online] Retrieved from the Internet: <URL: https://web.archive.org/web/20190503063620/

(56) References Cited

OTHER PUBLICATIONS https://support.snapchat.com/en-us/article/bitmoji-family>, (captured May 3, 2019), 4 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
"Instant Comics Starring You and Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.
Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Reign, Ashley, "How to Add My Friend's Bitmoji to My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tumbokon, Karen, "Snapchat Update: How to Add Bitmoji to Customizable Geofilters", International Business Times, [Online] Retrieved from the Internet : <URL: https://www.ibtimes.com/snapchat-update-how-add-bitmojicustomizable- geofilters-2448152>, (Nov. 18, 2016), 6 pgs.
"International Application Serial No. PCT/US2023/076997, International Search Report mailed Feb. 12, 2024", 4 pgs.
"International Application Serial No. PCT/US2023/076997, Written Opinion mailed Feb. 12, 2024", 9 pgs.

* cited by examiner

STYLIZING A WHOLE-BODY OF A PERSON

TECHNICAL FIELD

The present disclosure relates generally to providing augmented reality (AR) experiences using a messaging application.

BACKGROUND

Augmented reality (AR) is a modification of a virtual environment. For example, in virtual reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
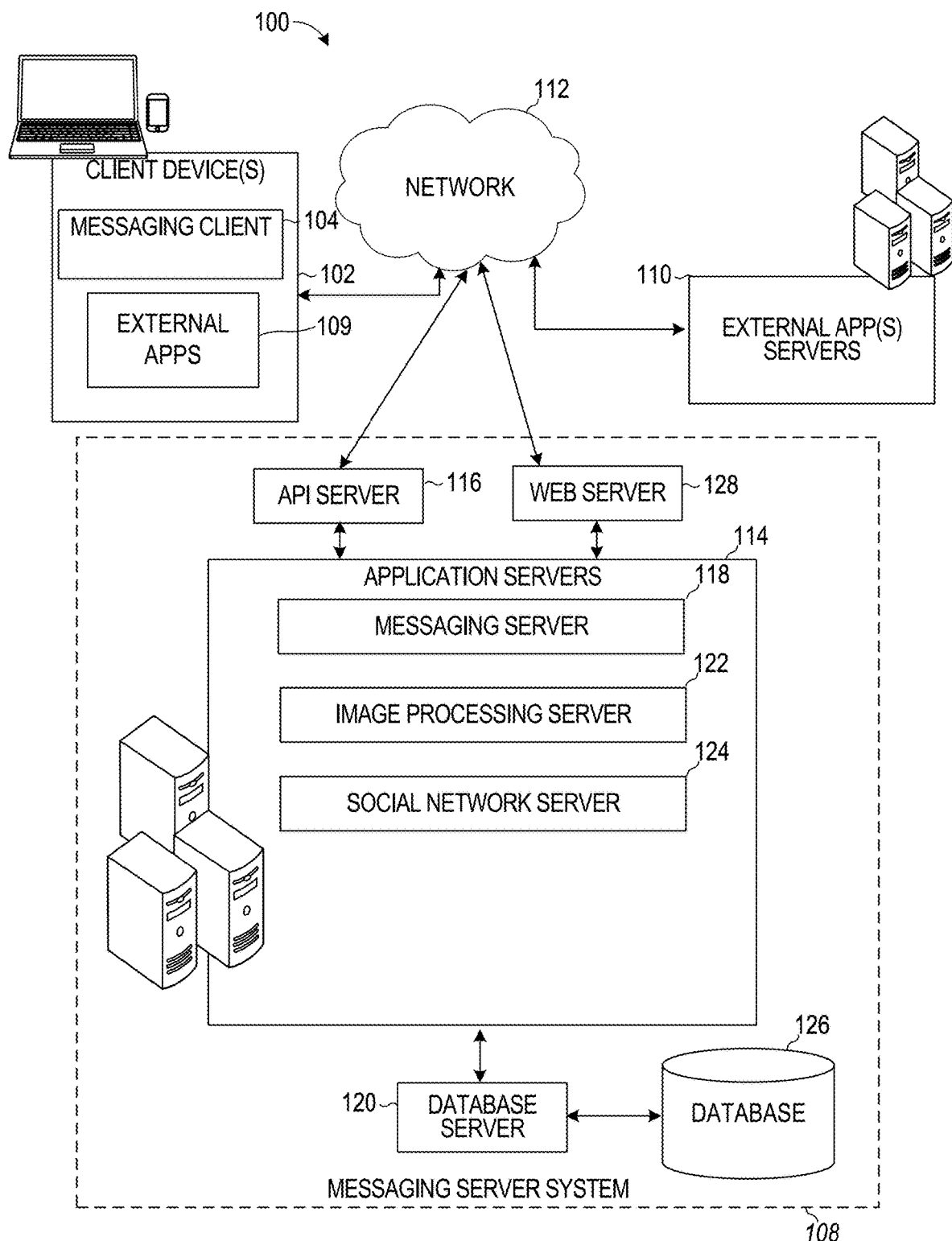
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, VR and AR systems display images representing a given user by capturing an image of the user and, in addition, obtaining a depth map using a depth sensor of the real-world human body depicted in the image. By processing the depth map and the image together, the VR and AR systems can detect positioning of a user in the image and can appropriately modify the user or background in the images. While such systems work well, the need for a depth sensor limits the scope of their applications. This is because adding depth sensors to user devices for the purpose of modifying images increases the overall cost and complexity of the devices, making them less attractive.

Certain systems do away with the need to use depth sensors to modify images. For example, certain systems allow users to replace a background in a videoconference in which a user's face is detected. Specifically, such systems can use specialized techniques that are optimized for recognizing a face of a user to identify the background in the images that depict the user's face. These systems can then replace only those pixels that depict the background so that the real-world background is replaced with an alternate background in the images. However, such systems are generally incapable of recognizing a whole body of a user. As such, if the user is more than a threshold distance from the camera such that more than just the face of the user is captured by the camera, the replacement of the background with an alternate background begins to fail. In such cases, the image quality is severely impacted, and portions of the face and body of the user can be inadvertently removed by the system as the system falsely identifies such portions as belonging to the background rather than the foreground of the images. Also, such systems fail to properly replace the background when more than one user is depicted in the image or video feed. Because such systems are generally incapable of distinguishing a whole body of a user in an image from a background, these systems are also unable to apply visual effects to certain portions of a user's body, such as converting, blending, transforming, changing stylizing, or morphing a body part (e.g., a face) into an AR graphic.

Some AR systems allow AR graphics or AR elements to be added to an image or video to provide engaging AR experiences. Such systems can receive the AR graphics from a designer and can scale and position the AR graphics within the image or video. In order to improve the placement and positioning of the AR graphics on a person depicted in the image or video, such systems detect a person depicted in the image or video and generate a rig representing bones of the person. This rig is then used to adjust the AR graphics based on changes in movement to the rig. While such approaches generally work well, the need for generating a rig of a person in real time to adjust AR graphics placement increases processing complexities and power and memory requirements. This makes such systems inefficient or incapable of running on small-scale mobile devices without sacrificing computing resources or processing speed. Also, the rig only represents movement of skeletal or bone structures of a person in the image or video and does not take into account any sort of external physical properties of the person, such as density, weight, skin attributes, and so forth. As such, any AR graphics in these systems can be adjusted in scale and positioning but cannot be deformed based on other physical properties of the person. In addition, an AR graphics designer typically needs to create a compatible rig for their AR graphic.

Some typical systems use mesh-based reconstruction to modify portions of a face that is depicted in an image. These systems usually receive a mesh that defines aspects of a face to modify. The mesh is then applied to a real-time image to modify the face depicted in the image. These systems are usually limited in their functionality as they can only realistically modify faces depicted in images and fail to perform properly when a full body of a user is depicted in the image. Such systems typically end up disproportionally adjusting body portions, which results in unrealistic modifications being applied in images.

The disclosed techniques improve the efficiency of using the electronic device by using a machine learning model to estimate or predict a stylized version of a whole body of a real-world person depicted in a received image or video in real time. The estimated or predicted stylized version of the whole body of the person is then applied to a portion of the image to replace a depiction of the real-world person with the stylized version of the whole body of the real-world person. By using a trained machine learning model to generate the stylized version of the whole body of the person, the disclosed techniques can apply one or more visual effects to the image or video in association with the real-world person depicted in the image or video in a more efficient and realistic manner. This can be done without the need for generating a rig or bone structure of the depicted object or performing any manual adjustments or photoshopping techniques, which can be time consuming. Particularly, the disclosed techniques can morph, transform, change, stylize, and/or blend one or more body parts of a whole body of a person depicted in the image or video into one or more AR elements taking into account movement and pose information of the person.

This simplifies the process of adding AR graphics to an image or video, which significantly reduces design constraints and costs in generating such AR graphics and decreases the amount of processing complexities and power and memory requirements. This also improves the illusion of the AR graphics being part of a real-world environment depicted in an image or video that depicts the person. This enables seamless and efficient addition of AR graphics to an underlying image or video in real time on small-scale mobile devices. The disclosed techniques can be applied exclusively or mostly on a mobile device without the need for the mobile device to send images/videos to a server. In other examples, the disclosed techniques are applied exclusively or mostly on a remote server or can be divided between a mobile device and a server.

Also, the disclosed techniques allow an AR graphics designer to generate a target style for their AR graphics without creating a compatible rig for the AR graphics, which saves time, effort, and creation complexity. The disclosed techniques use the target style to train one or more generative adversarial networks to generate training data to train a machine learning model to stylize a whole body of a real-world person into the target style. Specifically, the disclosed techniques can receive an image that includes a depiction of a whole body of a real-world person. The disclosed techniques apply a machine learning model to the image to generate a stylized version of the whole body of the real-world person corresponding to a given style. The machine learning model can be trained using training data to establish a relationship between a plurality of training images depicting synthetically rendered whole bodies of persons and corresponding ground-truth stylized versions of the whole bodies of the persons of the given style. The disclosed techniques replace the depiction of the whole body of the real-world person in the image with the generated stylized version of the whole body of the real-world person. This machine learning model, once trained, can be operated in real-time to generate or predict a stylized version of a whole body of a person depicted in a received real-time image or video. The generated or predicted stylized version can be applied to the real-time image or video to generate a desired effect in which the depicted real-world person is morphed or modified to have a size, height, scale, and/or look corresponding to the target style that was used to train the machine learning model.

As a result, a realistic display can be provided that shows the user or person being stylized according to a selected or given style while moving around a video in 3D, including changes to the body shape, body state, body style and visual attributes, body properties, position, and rotation, in a way that is intuitive for the user to interact with and select. This improves the overall experience of the user in using the electronic device. Also, by providing such AR experiences without using a depth sensor, the overall amount of system resources needed to accomplish a task is reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108, and external app(s) servers 110 via a network 112 (e.g., the Internet). A messaging client 104 can also communicate with locally-hosted third-party applications, such as external apps 109, using Application Programming Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data). In some examples, the client device 102 includes an eyewear device that is configured to generate augmented reality objects within lenses of the eyewear device to provide the augmented reality experiences discussed herein.

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
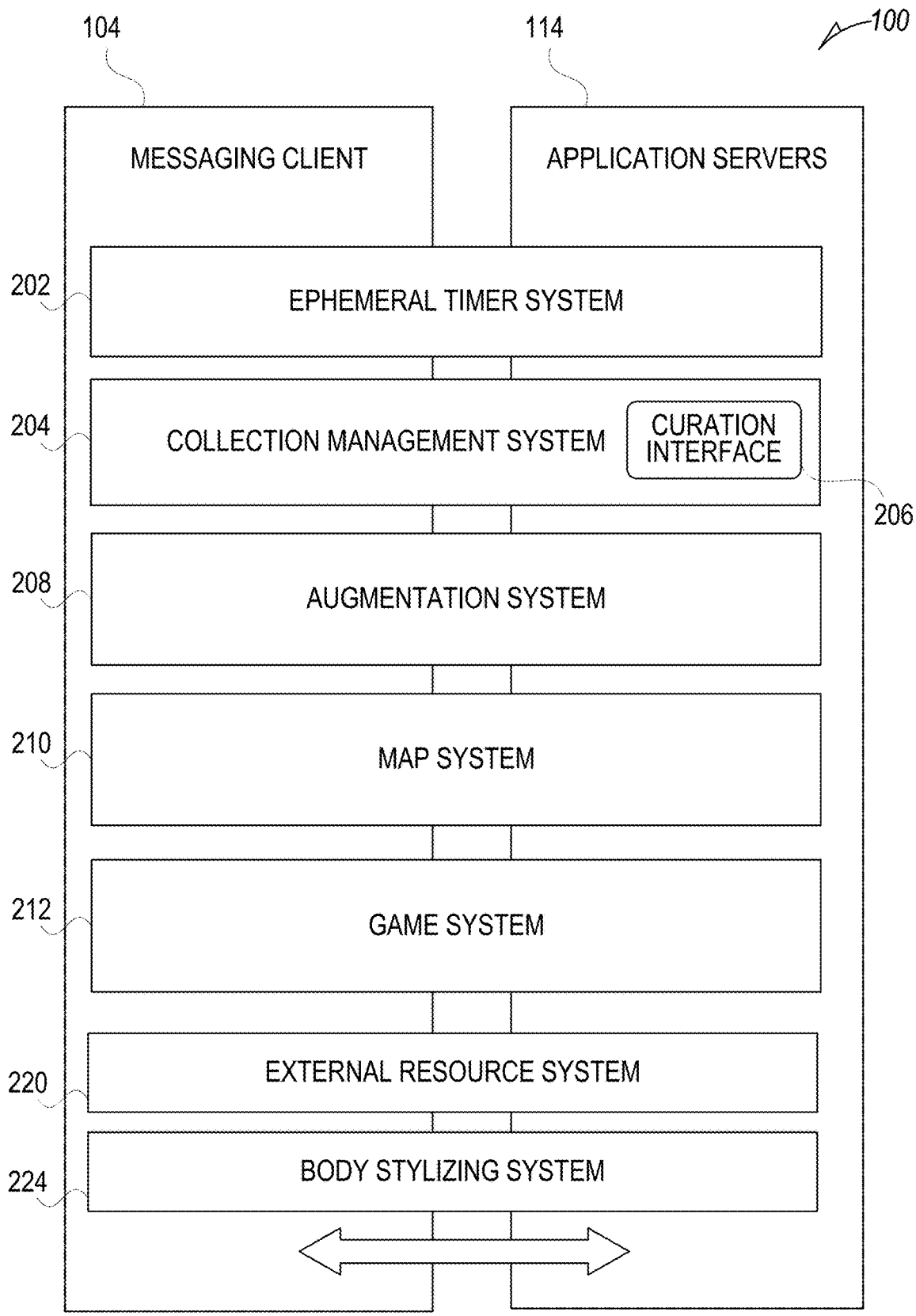
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., replacing a garment being worn by a user in a video or morphing, changing, blending or transforming a portion of a body of a person or user into an AR graphic, such as an AR werewolf or AR bat).

Figure 3:
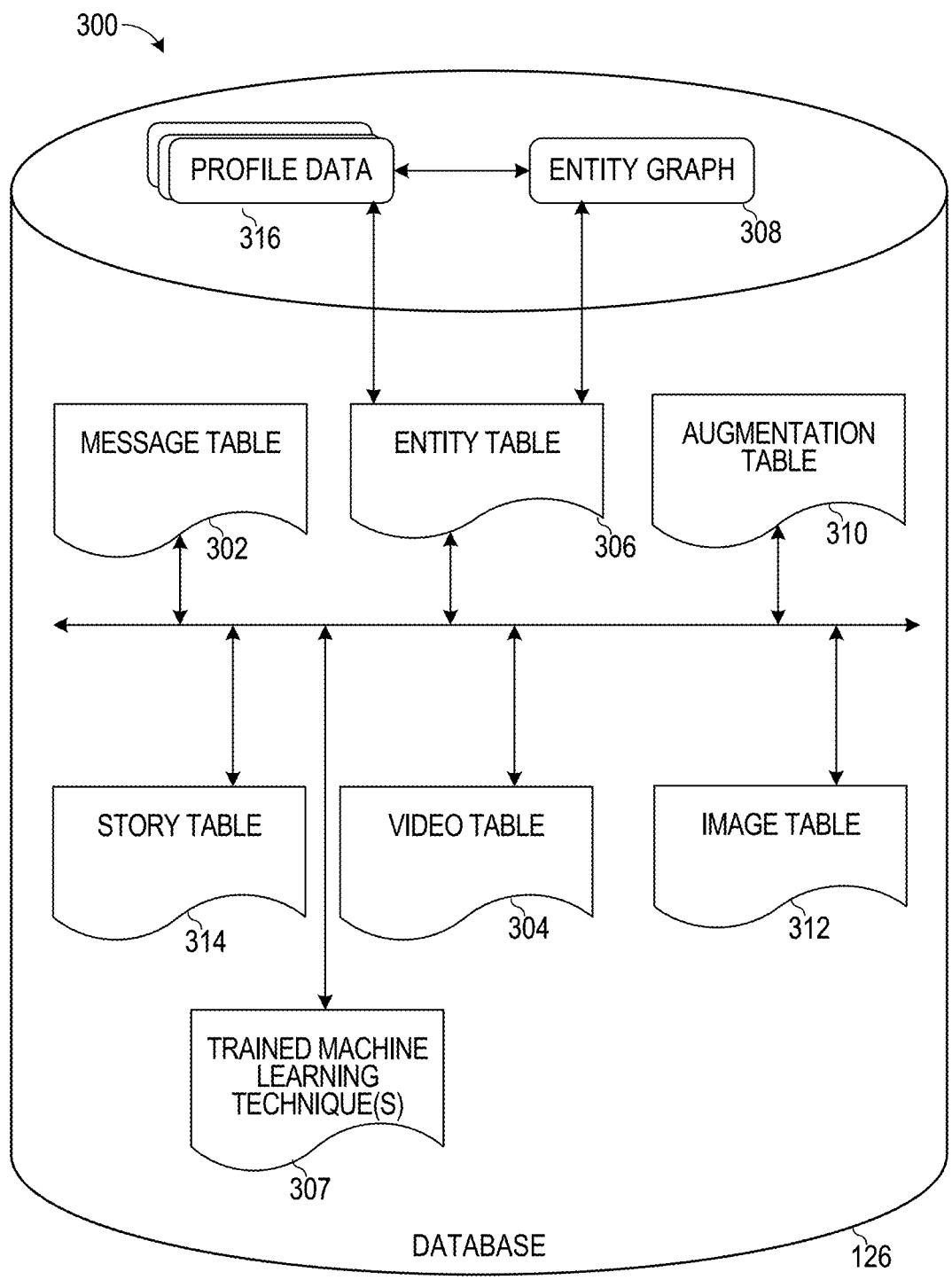
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an external application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app") or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can present to a user one or more AR experiences. As an example, the messaging client 104 can detect a person or user in an image or video captured by the client device 102. The messaging client 104 can apply a machine learning model (associated with a target style) to generate or estimate a stylized version of the person or object depicted in the image. The messaging client 104 can then generate a modified image depicting the stylized version of the person. While the disclosed examples are discussed in relation to modifying a person or user depicted in an image or video, similar techniques can be applied to modify any other real-world object, such as an animal, furniture, a building, and so forth.

This provides an illusion that the stylized real-world object or person is actually included in the real-world environment depicted in the modified image or video, which improves the overall user experience.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 including the first and second devices) that is used to align the shared AR session to a common point of origin, a common coordinate frame, and functions (e.g., commands to invoke functions) as well as other payload data (e.g., text, audio, video, or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only 2D avatars of users with or without different avatar characteristics). As another example, external resources that include small-scale versions of external applications (e.g., web-based versions of third-party applications) are provided with access to a second type of user data (e.g., payment information, 2D avatars of users, 3D avatars of users, and avatars with various avatar characteristics). Avatar characteristics include different ways to customize a look and feel of an avatar, such as different poses, facial features, clothing, and so forth.

A body stylizing system 224 receives an image that includes a depiction of a real-world object, such as a whole body of a human being, animal or other animate or inanimate object. The body stylizing system 224 applies a machine learning model to the image to generate a stylized version of the real-world object, such as a stylized version of the whole body of the human. The machine learning model can be trained using training data to establish a relationship between a plurality of training images depicting synthetically rendered whole bodies of persons and corresponding ground-truth stylized versions of the whole bodies of the persons of the given style. The body stylizing system 224 generates a modified image depicting the stylized real-world object.

In some examples, the body stylizing system 224 is a component that is accessed by an AR/VR application implemented on the client device 102. The AR/VR application uses an RGB camera to capture a monocular image of a user or person. The AR/VR application applies various trained machine learning techniques on the captured image of the user to generate the stylized whole body of the person and to apply one or more AR visual effects to the captured image to generate a modified image including the AR visual effects. In some implementations, the AR/VR application continuously captures images of the user and updates the stylized version of the person in real time or periodically to continuously or periodically update the applied one or more visual effects. This allows the user to move around in the real world and see the one or more visual effects update in real time.

In training, the body stylizing system 224 obtains training data that includes a plurality of training images depicting synthetically rendered whole bodies of persons and corresponding ground-truth stylized versions of the whole bodies of the persons of the given style. A machine learning technique (e.g., a deep neural network or other machine learning model) is trained based on features of the plurality of training images in the training data. Specifically, the machine learning technique is applied to a first set of the training data that includes a first training image of the plurality of training images depicting synthetically rendered whole bodies of persons to generate an estimated a stylized version of the whole body of the person depicted in the first training image. The machine learning technique computes a deviation between the estimated stylized version of the whole body of the person depicted in the first training image and the ground-truth stylized version of the whole body of the person depicted in the first training image. One or more parameters of the machine learning technique (model) are updated based on the deviation between the estimated stylized version of the whole body of the person depicted in the first training image and the ground-truth stylized version of the whole body of the person depicted in the first training image.

This process is repeated until a stopping criterion is reached. At that point, the trained machine learning model is output, stored, and used to generate stylized versions of whole bodies of persons depicted in an image or video in real time.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying augmented reality experiences). An AR content item or AR item may be a real-time special effect and sound that may be added to an image or a video.

As described above, augmentation data includes AR content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of real-world objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items or elements thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using body/person detection, the body/person is detected on an image with use of a specific body/person detection algorithm (e.g., 3D human pose estimation and mesh reconstruction processes). Then, an ASM algorithm is applied to the body/person region of an image to detect body/person feature reference points.

Other methods and algorithms suitable for body/person detection can be used. For example, in some examples, features are located using a landmark, which represents a distinguishable point present in most of the images under consideration. For body/person landmarks, for example, the location of the left arm may be used. If an initial landmark is not identifiable, secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the body/person determined by a global body/person detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, 3D human pose estimation, 3D body mesh reconstruction, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a body/person within the image or video stream and provides modification icons associated with a computer animation model to transform image data, or the computer animation model can be present as associated with an interface described herein. The modification icons include changes that may be the basis for modifying the user's body/person within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the body/person being modified by the transformation system and store it for later viewing or browse to other areas of the imaging application. Where multiple faces are modified by the transformation system, the user may toggle the modification on or off globally by tapping or selecting a single body/person modified and displayed within a graphical user interface. In some examples, individual bodies/persons, among a group of multiple bodies/persons, may be individually modified, or such modifications may be individually toggled by tapping or selecting the individual body/person or a series of individual bodies/persons displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Trained machine learning technique(s) 307 stores parameters of one or more machine learning models that have been trained during training of the body stylizing system 224. For example, trained machine learning techniques 307 stores the trained parameters of one or more neural network machine learning techniques and/or generative adversarial networks (GANs).

Data Communications Architecture

Figure 4:
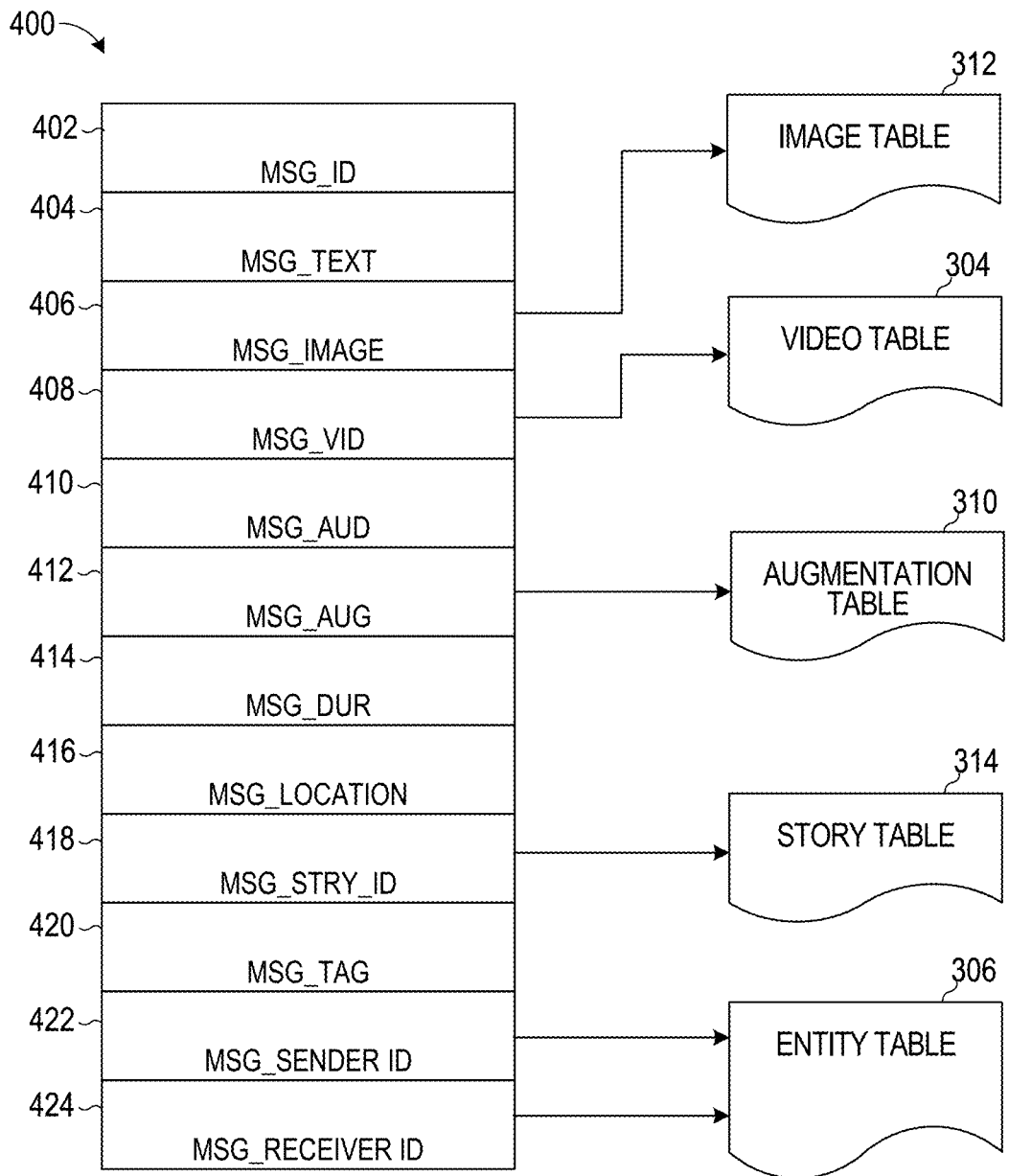
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Body Stylizing System

Figure 5:
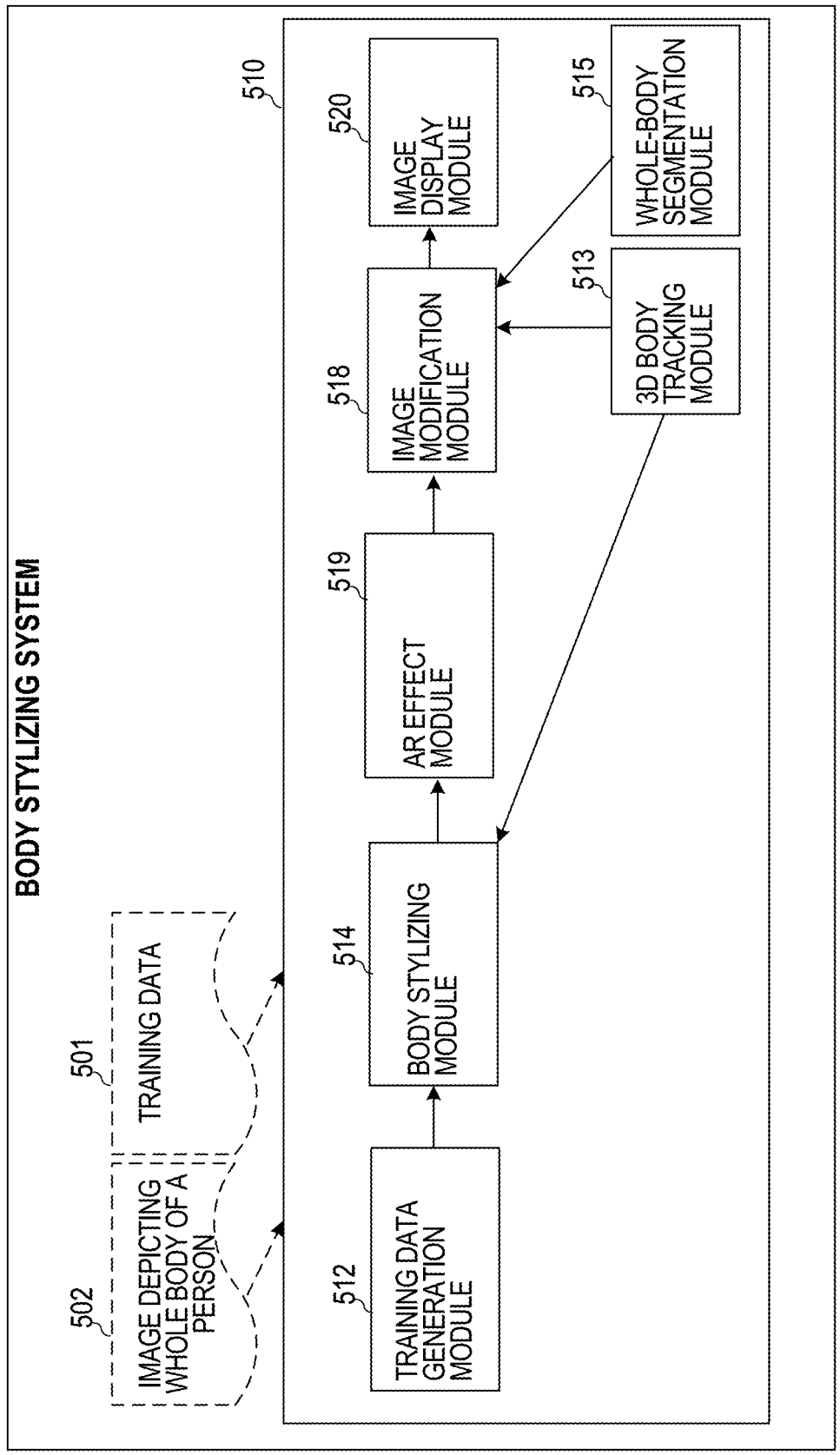
FIGS. 5-7 are block diagrams showing components of an example body stylizing system, according to some examples.

FIG. 5 is a block diagram showing an example body stylizing system 224, according to some examples. Body stylizing system 224 includes a set of components 510 that operate on a set of input data, such as training data 501 including a monocular image or images 502 depicting a whole body of a person. The set of input data (e.g., training data 501) is obtained from one or more database(s) (FIG. 3) during the training phases and the input data (e.g., one or more images 502) is obtained from an RGB camera of a client device 102 when an AR/VR application is being used, such as by a messaging client 104. Body stylizing system 224 includes a training data generation module 512, a body stylizing module 514, an AR effect module 519, an image modification module 518, an image display module 520, a 3D body tracking module 513, and a whole-body segmentation module 515. In some cases, the 3D body tracking module 513 performs tracking in 2D rather than 3D by extracting body key points in an image.

In some examples, the body stylizing system 224 receives an image 502 that includes a depiction of a whole body of real-world person. The body stylizing system 224 applies a machine learning model to the image 502 to generate a stylized version of the whole body of the real-world person. The machine learning model can be trained using training data to establish a relationship between a plurality of training images depicting synthetically rendered whole bodies of persons and corresponding ground-truth stylized versions of the whole bodies of the persons of the given style. The body stylizing system 224 replaces the depiction of the whole body of the real-world person in the image 502 with the generated stylized version of the whole body of the real-world person. In some examples, the client device 102 and/or the messaging client 104 can implement different sets of machine learning models. Each one of the machine learning models may have been trained to generate a respective stylized version of a whole body of a person based on a different respective target style. User input can be received to activate a given one of the machine learning models by selecting between various options each associated with a different style. In some examples, the image 502 is a frame of a video, and the generated stylized version is generated and applied to modify the frame and/or video in real-time.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments. Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), neural networks (NN), deep NN (DNN), matrix factorization, and Support Vector Machines (SVM) tools may be used for classifying or scoring videos.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features for analyzing the data to generate an assessment. Each of the features is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example, the features may be of different types and may include one or more of content, concepts, attributes, historical data, and/or user data, merely for example. The machine-learning algorithms use the training data to find correlations among the identified features that affect the outcome or assessment. In some examples, the training data includes labeled data, which is known data for one or more identified features and one or more outcomes, such as detecting communication patterns, detecting the meaning of the message, generating a summary of a message, detecting action items in messages, detecting urgency in the message, detecting a relationship of the user to the sender, calculating score attributes, calculating message scores, etc.

With the training data and the identified features, the machine-learning tool is trained by a machine-learning program training. The machine-learning tool appraises the value of the features as they correlate to the training data. The result of the training is the trained machine-learning program. When the trained machine-learning program is used to perform an assessment, new data is provided as an input to the trained machine-learning program, and the trained machine-learning program generates the assessment as output.

The machine-learning program supports two types of phases, namely a training phase and prediction phase. In training phases, supervised learning, unsupervised or reinforcement learning may be used. For example, the machine-learning program (1) receives features (e.g., as structured or labeled data in supervised learning) and/or (2) identifies features (e.g., unstructured or unlabeled data for unsupervised learning) in training data. In prediction phases, the machine-learning program uses the features for analyzing video frames to generate outcomes or predictions or stylized version of a whole body of a person based on a target style, as examples of an assessment.

In the training phase, feature engineering is used to identify features and may include identifying informative, discriminating, and independent features for the effective operation of the machine-learning program in pattern recognition, classification, and regression. In some examples, the training data includes labeled data, which is known data for pre-identified features and one or more outcomes. Each of the features may be a variable or attribute, such as individual measurable property of a process, article, system, or phenomenon represented by a data set (e.g., the training data).

In training phases, the machine-learning program uses the training data to find correlations among the features that affect a predicted outcome or assessment. With the training data and the identified features, the machine-learning program is trained during the training phase at machine-learning program training. The machine-learning program appraises values of the features as they correlate to the training data. The result of the training is the trained machine-learning program (e.g., a trained or learned model).

Further, the training phases may involve machine learning, in which the training data is structured (e.g., labeled during preprocessing operations), and the trained machine-learning program implements a relatively simple neural network capable of performing, for example, classification and clustering operations. In other examples, the training phase may involve deep learning, in which the training data is unstructured, and the trained machine-learning program implements a DNN that is able to perform both feature extraction and classification/clustering operations.

A neural network generated during the training phase, and implemented within the trained machine-learning program, may include a hierarchical (e.g., layered) organization of neurons. For example, neurons (or nodes) may be arranged hierarchically into a number of layers, including an input layer, an output layer, and multiple hidden layers. Each of the layers within the neural network can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron. In some cases, these neurons implement one or more encoder or decoder networks.

In some examples, the neural network may also be one of a number of different types of neural networks, including a single-layer feed-forward network, an Artificial Neural Network (ANN), GAN, a Recurrent Neural Network (RNN), a symmetrically connected neural network, and unsupervised pre-trained network, a Convolutional Neural Network (CNN), or a Recursive Neural Network (RNN), merely for example.

During prediction phases, the trained machine-learning program is used to perform an assessment. Video data is provided as an input to the trained machine-learning program, and the trained machine-learning program generates the assessment as output, responsive to receipt of the video data.

In some examples, the messaging client 104 can receive input that selects a first AR experience associated with a first target style. In response, a first one of the machine learning models is accessed and used to generate a first stylized version of the whole body of the person depicted in the image. The first stylized version can be used to modify a real-world object depicted in an input image or video to generate modified image or video depicting the stylized version of the whole-body of the person.

In another example, the messaging client 104 receives input that selects a second AR experience associated with a second target style. In response, a second one of the machine learning models is accessed and used to generate a second stylized version of the whole-body of the person depicted in the image. The second stylized version can be used to modify a real-world object depicted in an input image or video to generate modified image or video depicting the stylized version of the whole-body of the person.

In some examples, the real-world object includes a person. In some examples, body stylizing system 224 receives an image that includes a depiction of a whole body of a real-world person and applies a machine learning model to the image to generate a stylized version of the whole body of the real-world person corresponding to a given style. The machine learning model can be trained using training data to establish a relationship between a plurality of training images depicting synthetically rendered whole bodies of persons and corresponding ground-truth stylized versions of the whole bodies of the persons of the given style. The body stylizing system 224 replaces the depiction of the whole body of the real-world person in the image with the generated stylized version of the whole body of the real-world person.

In some examples, the whole body of the real-world person includes a head, arms, torso, and legs, and the stylized version of the whole body of the real-world person includes a stylized version of the head, arms, torso, and legs. In some examples, the machine learning model includes a deep neural network.

In some examples, the body stylizing system 224 receives input that selects the given style from a plurality of styles. The body stylizing system 224 selects the machine learning model from a plurality of machine learning models each configured to generate a different stylized version of a whole body of a person corresponding to a respective one of the plurality of styles. In some examples, the plurality of styles includes at least one of a zombie style, a body builder style, a cartoon style, anime, Gollum, neanderthal, and/or a barbie style.

In some examples, the body stylizing system 224 generates the training data by performing training operations. The body stylizing system 224 accesses a first set of latent code by first and second whole-body GANs. The body stylizing system 224 renders, by the first whole body GAN, a first synthetic whole body of a person corresponding to the first set of latent code and renders, by the second whole-body GAN, a second synthetic whole body of the person corresponding to the first set of latent code. The body stylizing system 224 computes directional loss, by a directional loss model associated with the given style, based on the second synthetic whole body of the person. The body stylizing system 224 updates one or more weights of the second GAN based on the directional loss and repeats the operations for rendering of the second synthetic whole body of the person, the computing of the directional loss and the updating of the one or more weights until a stopping criterion is reached.

In some examples, the body stylizing system 224 determines that the stopping criterion has been reached and, in response, repeats the operations for a second set of latent code. The body stylizing system 224 generates a pair of images of the training data by applying a new latent code to the first and second whole-body GANs to generate a first of the plurality of training images depicting synthetically rendered whole bodies of persons and a first of the ground-truth stylized versions of the whole bodies of the persons. In some examples, the body stylizing system 224 trains the machine learning model based on the paired images of the training data.

In some examples, the body stylizing system 224 accesses the first set of latent code by first and second face-based GANs and renders, by the first face-based GAN, a first synthetic face of the person corresponding to the first set of latent code. The body stylizing system 224 renders, by the second face-based GAN, a second synthetic face of the person corresponding to the first set of latent code. The body stylizing system 224 computes directional loss, by the directional loss model associated with the given style, based on the second synthetic face of the person, and updates one or more weights of the second GAN based on the directional loss. The body stylizing system 224 repeats the rendering of the second synthetic face of the person, the computing of the directional loss and the updating of the one or more weights until the stopping criterion is reached again.

In some examples, the body stylizing system 224 applies the new latent code to the first and second face-based GANs and generates a second pair of images of the training data based on an output of the first and second face-based GANs. In some examples, the body stylizing system 224 overlays a synthetic face of the person generated by the second face-based GAN with the second synthetic whole body of the person of the paired images generated by the second whole-body GAN. The body stylizing system 224 fuses smoothly the second synthetic face of the person generated by the second face-based GAN with the second synthetic whole body of the person of the paired images generated by the second whole-body GAN. The body stylizing system 224 stores, as the second synthetic whole body of the person of the paired images, the second synthetic face of the person generated by the second face-based GAN which has been smoothly fused with the second synthetic whole body of the person of the paired images generated by the second whole-body GAN.

In some examples, the body stylizing system 224 selects a portion of the second synthetic whole body of the person corresponding to a body part. The body stylizing system 224 identifies a set of weights of the second GAN corresponding to the body part and computes the directional loss, by the directional loss model associated with the given style, based on the selecting portion of the second synthetic whole body of the person corresponding to the body part. The body stylizing system 224 updates the set of weights corresponding to the body part without updating other weights associated with other body parts based on the direction loss.

In some examples, the body stylizing system 224 divides the second synthetic whole body of the person into individual portions corresponding to different body parts. The body stylizing system 224 computes the directional loss separately for each of the individual portions.

In some examples, the body stylizing system 224 trains the machine learning model by performing training operations including: accessing the training data. The body stylizing system 224 applies the machine learning model to a first set of the training data including a first training image of the plurality of training images depicting synthetically rendered whole bodies of persons to generate an estimated a stylized version of the whole body of the person depicted in the first training image. The body stylizing system 224 computes a deviation between the estimated stylized version of the whole body of the person depicted in the first training image and the ground-truth stylized version of the whole body of the person depicted in the first training image. The body stylizing system 224 updates one or more parameters of the machine learning model based on the deviation between the estimated stylized version of the whole body of the person depicted in the first training image and the ground-truth stylized version of the whole body of the person depicted in the first training image.

In some examples, the body stylizing system 224 generates whole body key points for the whole body of the person depicted in the first training image. The estimated stylized version of the whole body of the person depicted in the first training image can be generated based on the whole body key points. In some examples, the image is received as a frame of a video depicting the real-world person. In such cases, the depiction of the whole body of the real-world person in the video is replaced with the stylized version in real time.

The training data generation module 512 is configured to generate paired images that depict synthesized (fake or computer generated) versions of a whole body of a person and a stylized version of the synthesized versions of the whole body of the person. Specifically, the training data generation module 512 includes a first GAN that is configured to receive as input a latent code or vector and to render a first image that depicts a synthesized whole body of a person. The training data generation module 512 includes a second GAN that is configured to receive as input the same latent code or vector and to render a second image that depicts a stylized version of the synthesized whole body of the person according to a specific style. Together the first and second images form a training data pair that is provided to the body stylizing module 514 to train the machine learning model to estimate a stylized version of a person from a real-time image or video that is received that depicts a whole body of the person according to the specific style.

For example, the body stylizing module 514 receives the first image of the training data pair and estimates or generates an estimated image that includes an estimated stylized version of the person depicted in the first image. The body stylizing module 514 then compares the estimated image with the second image to compute a deviation. A stopping criterion is compared or analyzed with respect to the deviation. If the stopping criterion is not met, one or more parameters of the body stylizing module 514 are updated and another pair of images are generated by the training data generation module 512 using another latent code or vector and used to again train the body stylizing module 514. Once the stopping criterion is met, the body stylizing module 514 is stored as a trained machine learning model. The trained body stylizing module 514 is applied to a new image that depicts a whole body of a person and generates a stylized version of the whole body of the person. The AR effect module 519 can modify the new image to replace the whole body of the person with the stylized version of the whole body of the person.

In some cases, to improve convergence and to improve the quality of the output of the body stylizing module 514, a 2D body tracking or the 3D body tracking module 513 can be used to identify 2D or 3D whole body key points for the whole body of the person depicted in the training image and/or in the image received from the client device 102. The estimated stylized version of the whole body of the person can then be generated based on the whole body key points by the body stylizing module 514.

Figure 6:
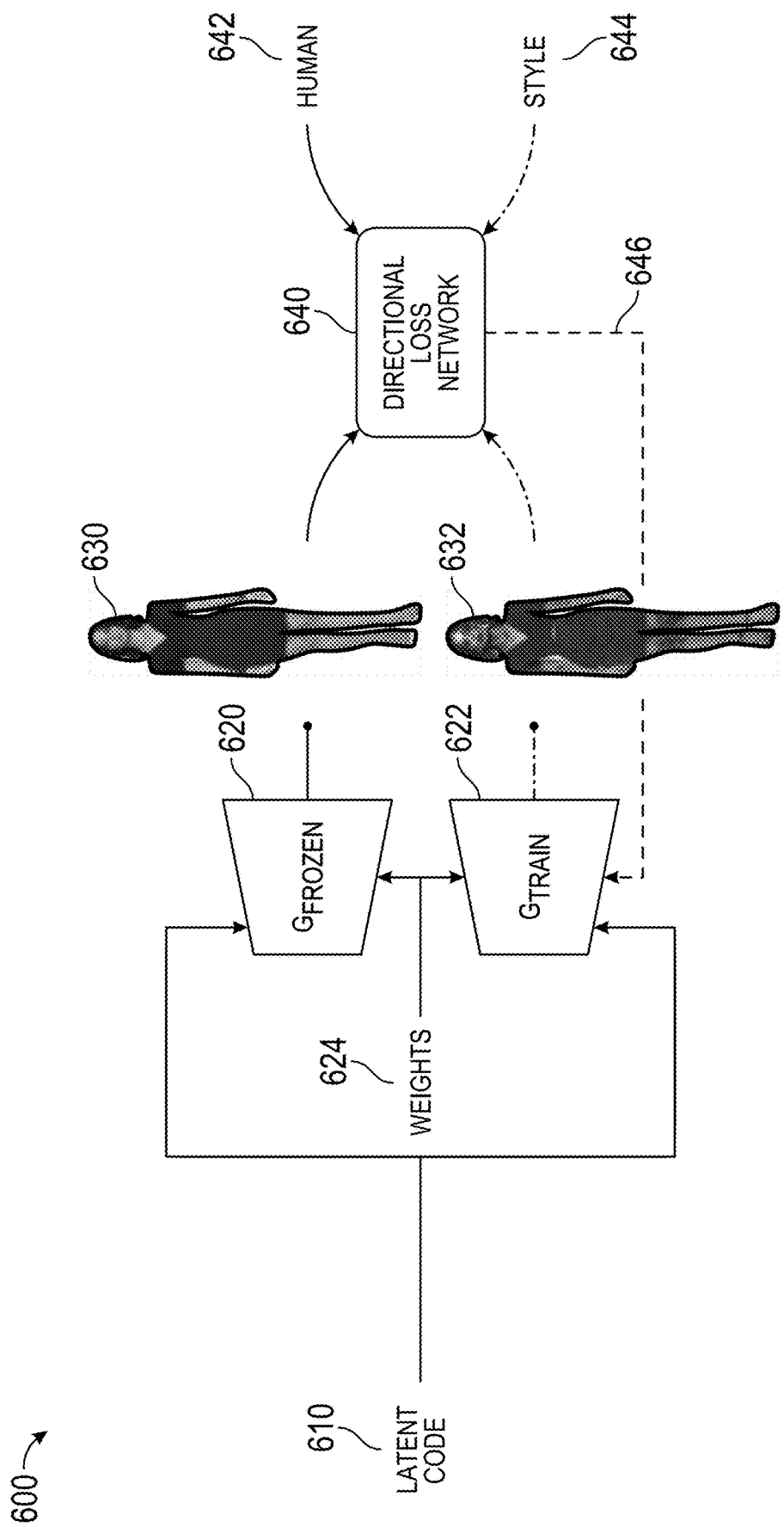

In some examples, the first and second GANs of the training data generation module 512 are trained separately and before the body stylizing module 514. FIG. 6 shows a set of components 600 of the training data generation module 512, according to some examples. Specifically, the components 600 include a latent code 610 which can be generated by a latent code generator, a first whole body GAN 620, a second whole body GAN 622, and a directional loss network 640 that is associated with a particular style 644.

The components 600 are configured to train the second whole body GAN, shown in FIG. 6 as "GFROZEN" 622, to generate an image 632 of a stylized version of the whole body of the person generated by the first whole body GAN, GFROZEN 620. Initially, the first whole body GAN, GFROZEN 620, and the second whole body GAN, shown in FIG. 2 as "GTRAIN" 622, are configured with a same set of weights 624. The first whole body GAN, GFROZEN 620, receives the latent code 610 from the latent code generator, which can be a random number generator. The first whole body GAN, GFROZEN 620 generates a first image that depicts a normal un-stylized whole body of a person 630. Because the first and second whole body GANs 620 and 622 are initialized with the same set of weights 624, in parallel, the second whole body GAN, GTRAIN 622, also generates a second image that depicts a normal un-stylized whole body of a person as its output image 632.

The images generated by the first and second whole body GANs 620 and 622 are provided to the directional loss network 640. The directional loss network 640 receives a style 644 representing parameters of a target style for a particular type of object, such as a whole body of a human 642. The directional loss network 640 is configured to generate a loss representing how far the output image 632 is from looking like the target style according to an input text prompt. In some cases, the directional loss network 640 implements an image language model. In some examples, the directional loss network 640 computes the loss based only on a text prompt or based on a text prompt and one or more example images of the target style.

The loss is then used to update one or more parameters, such as the weights, of the second GAN 622. The parameters of the first whole body GAN 620 are not updated at this stage. Next, the second whole body GAN 622 is again applied to the same latent code 610 to generate a new image as output image 632 that represents a stylized version of the person 630 depicted by the first image generated by the first whole body GAN 620. This image is again applied to the directional loss network 640 to recompute the loss representing how far the output image 632 is from looking like the target style and the parameters of the second whole body GAN 622 are again updated based on this loss. This process continues until a stopping criterion computed based on the loss of the directional loss network 640 reaches a threshold condition. In some examples, once the stopping criterion is met, the first and second whole body GANs 620 and 622 are used as a portion of the training data generation module 512 to generate new pairs of images for training the body stylizing module 514.

Figure 7:
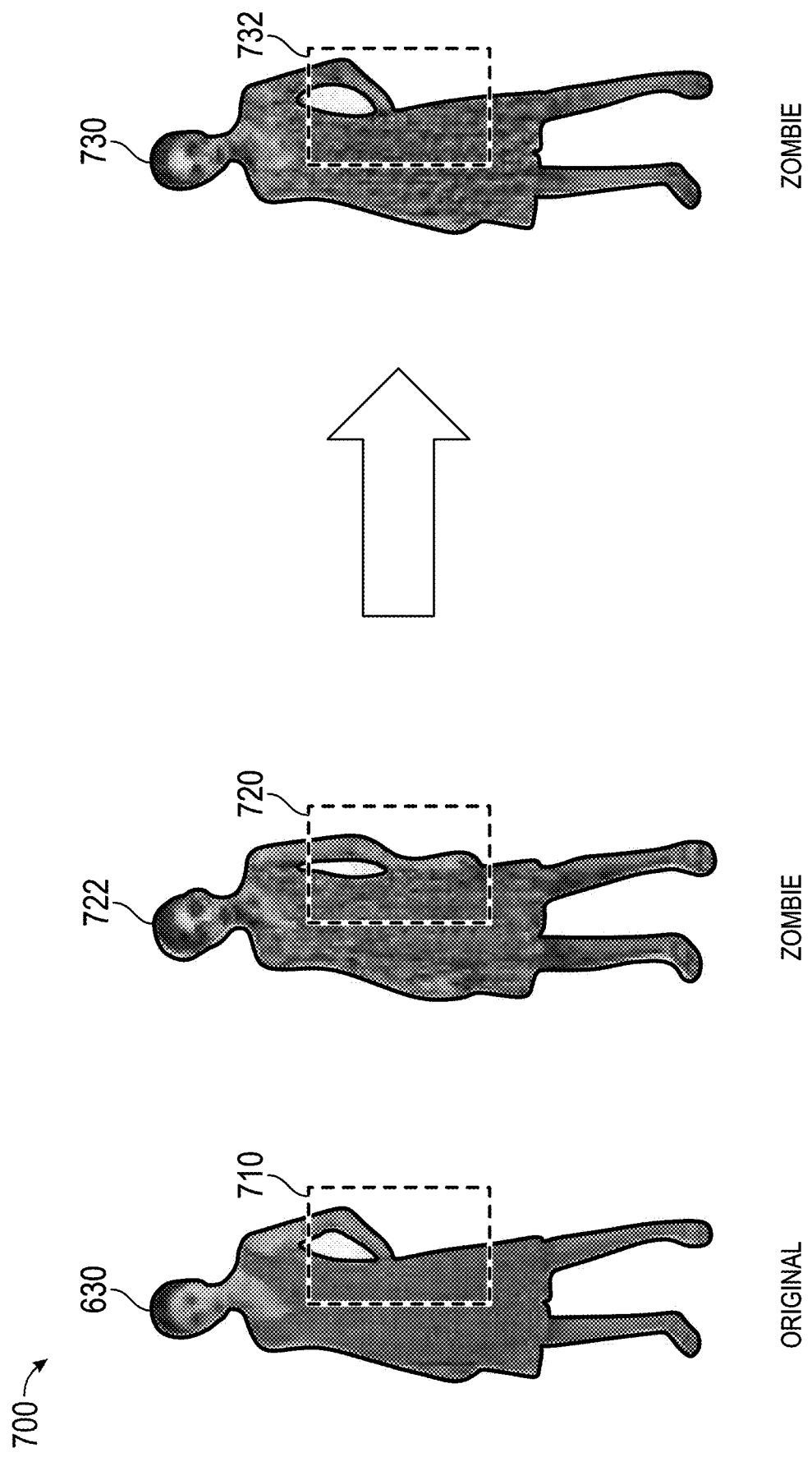

In some examples, the first and second whole body GANs 620 and 622 are trained in one or more iterations. At each iteration, the body stylizing system 224 determines which layers of the second whole body GAN 622 to optimize. To do so, the body stylizing system 224 samples a normally distributed random latent vector/code (e.g., of size 512). The latent code/vector is passed through a mapping, fully-connected, network to generate a resultant vector (w) to modulate layers of the first and second whole body GANs 620 and 622. The final result is two images that are output by the first and second whole body GANs 620 and 622. In some cases, the images are divided into body parts (e.g., head, torso, legs, and so forth). A same body part from both images that are output by the first and second whole body GANs 620 and 622 is randomly selected and cropped. For example, as shown in the set of images 700 of FIG. 7, a random body part 710 is cropped from the image of the person 630 provided or generated by the first whole body GAN 620 and the same random body part 720 is cropped from the stylized version of the body 722 depicted in the image 632 provided or generated by the second whole body GAN 622. A loss is then computed by the directional loss network 640 based on the cropped portions of the images with an input text prompt pair (e.g., "human" and "zombie"), such as using directional clip losses.

The loss computed by the directional loss network 640 and backpropagated through the first and second whole body GANs 620 and 622 to update the w vector and to obtain a w_prime vector. An absolute difference can be computed between the w vector and the w_prime vector to choose the k largest (most changing) elements of these vectors. The indices of these elements can correspond to the layer indices of the second whole body GAN 622. All of the layers of the second whole body GAN 622 are frozen except for the layers corresponding to the k elements. In some examples, the first six layers of the second whole body GAN 622 are frozen if the style does not have any pose changes.

After the layers of the second whole body GAN 622 are selected to be trained, a normally distributed random latent vector/code (e.g., of size 512) is again sampled. This vector is passed through a mapping network to generate a result vector (w) which is then provided to the first whole body GAN 620 and the second whole body GAN 622 to generate respective images of whole or full bodies of a synthesized person. The whole body depicted in the two images generated by the first and second whole body GANs 620 and 622 is divided into three or more parts (e.g., head, torso, and legs) and a randomly selected body part is cropped from both images. A random perspective transformation can be applied to the cropped portions to simulate different viewpoints and to avoid clip model overfitting. The cropped portions from both images along with their text-prompts are provided to the directional loss network 640 to compute the directional losses. This can be done by estimating the embeddings of each image and its text-prompt (four embeddings in total), computing the displacement vectors (image2_embeddings–image1_embeddings and text-prompt2_embeddings–ext-prompt1_embeddings), and finally taking the cosine similarity between these two resultant vectors. The loss is backpropagated through the first and/or second whole body GANs 620 and 622 to take a step in the gradient direction and update the weights of the second whole body GAN 622.

In some examples, the training data generation module 512 includes first and second face GANs. Specifically, in addition to the first and/or second whole body GANs 620 and 622, the training data generation module 512 includes first and second face GANs (not shown) that perform similar functions as the first and/or second whole body GANs 620 and 622 with respect to faces only. In such cases, the training data generation module 512 includes first and second whole body GANs 620 and 622 configured to generate images depicting a whole body of a synthesized person and a stylized version of that body and first and second face GANs configured to generate images depicting a face of a synthesized person and a stylized version of that face.

In such circumstances, the face or face-only GANs are trained by performing a set of training operations. Specifically, the first face GAN is trained to receive a latent code/vector and generate a face-only synthesized image of a person. In parallel, the second face GAN is trained to receive the same latent code/vector and generate a stylized version of the face only of the person. The output image of the second face GAN is provided to the directional loss network 640 to compute a directional loss based on the target style. The directional loss is fed back to the second face GAN to update one or more parameters of the face GAN. Once a stopping criterion is reached, the second face GAN is trained to generate a new image of a synthesized face that is stylized according to the target style, and the first face GAN generates the synthesized face without the target style.

In some examples, the training data generation module 512 includes four GANs (two full or whole body GANs, such as first and second whole body GANs 620 and 622, and two face-only GANs). A synthetic dataset of paired full-body images is generated using the first and second whole body GANs 620 and 622 (as discussed above) for a given latent code/vector. Given a pair of original and stylized full or whole-body images (I1 and I2) generated by the first and second whole body GANs 620 and 622, the faces are cropped from this pair of images to provide cropped faces F1 and F2. These cropped faces are projected onto the latent space of the trained face-only GAN that is configured to generate stylized version of a synthesized face, such as using a StyleGAN encoder. After this projection is completed, a resulting set of a pair of latent vectors is provided. These two vectors are forward-passed through the first and second face-only GANs to produce high-resolution face images of F1 and F2 which can be referred to as F1_prime and F2_prime.

The F1_prime and F2_prime are fused back smoothly onto the pair of original and stylized full- or whole-body images (I1 and I2). To do so, an optimization algorithm that searches for the best matching face images to faces in the full-body images is used. The optimization can start in a first iteration from the pair of latent vectors and searches for new latent vectors that given a pair of faces that when fused with I1 and I2 result in no seams or artefacts being visible. In some cases, this can be done by formulating losses on: 1) the background of the faces F1_prime, F2_prime and faces in I1 and I2, 2) the borders of F1, F2 where the stitching happens on I1 and I2. This optimization can happen on each pair in the paired full-body synthetic dataset. At the end, a new synthetic paired dataset of original and stylized full-body human images is provided where the faces are of high quality and resolution (e.g., 1024×1024).

In an example, the AR effect module 519 selects and applies one or more AR elements or graphics to an object depicted in the image or video (e.g., the deformed object) based on the segmentation mask estimated by the training data generation module 512 associated with the stylized whole-body of the person. These AR graphics combined with the real-world object depicted in the image or video are provided to the image modification module 518 to render an image or video that depicts the stylized version of the person wearing the AR object, such as an AR purse or earrings.

The image modification module 518 adjusts the image captured by the camera based on the AR effect selected by the AR effect module 519. The image modification module 518 adjusts the way in which the AR elements placed over the stylized version of the person depicted in the image or video is/are presented in an image or video. Image display module 520 combines the adjustments made by the image modification module 518 into the received monocular image or video depicting the user's body. The image or video is provided by the image display module 520 to the client device 102 and can then be sent to another user or stored for later access and display.

In some examples, the image modification module 518 receives 2D or 3D body tracking information representing the 3D positions of the user depicted in the image from the 3D body tracking module 513. The 3D body tracking module 513 generates the 2D or 3D body tracking information by processing the training data 501 using additional machine learning techniques. The image modification module 518 can also receive a whole-body segmentation representing which pixels in the image correspond to the whole body of the user from another machine learning technique. The whole-body segmentation can be received from the whole-body segmentation module 515. The whole-body segmentation module 515 generates the whole-body segmentation by processing the training data 501 using a machine learning technique.

Figure 8:
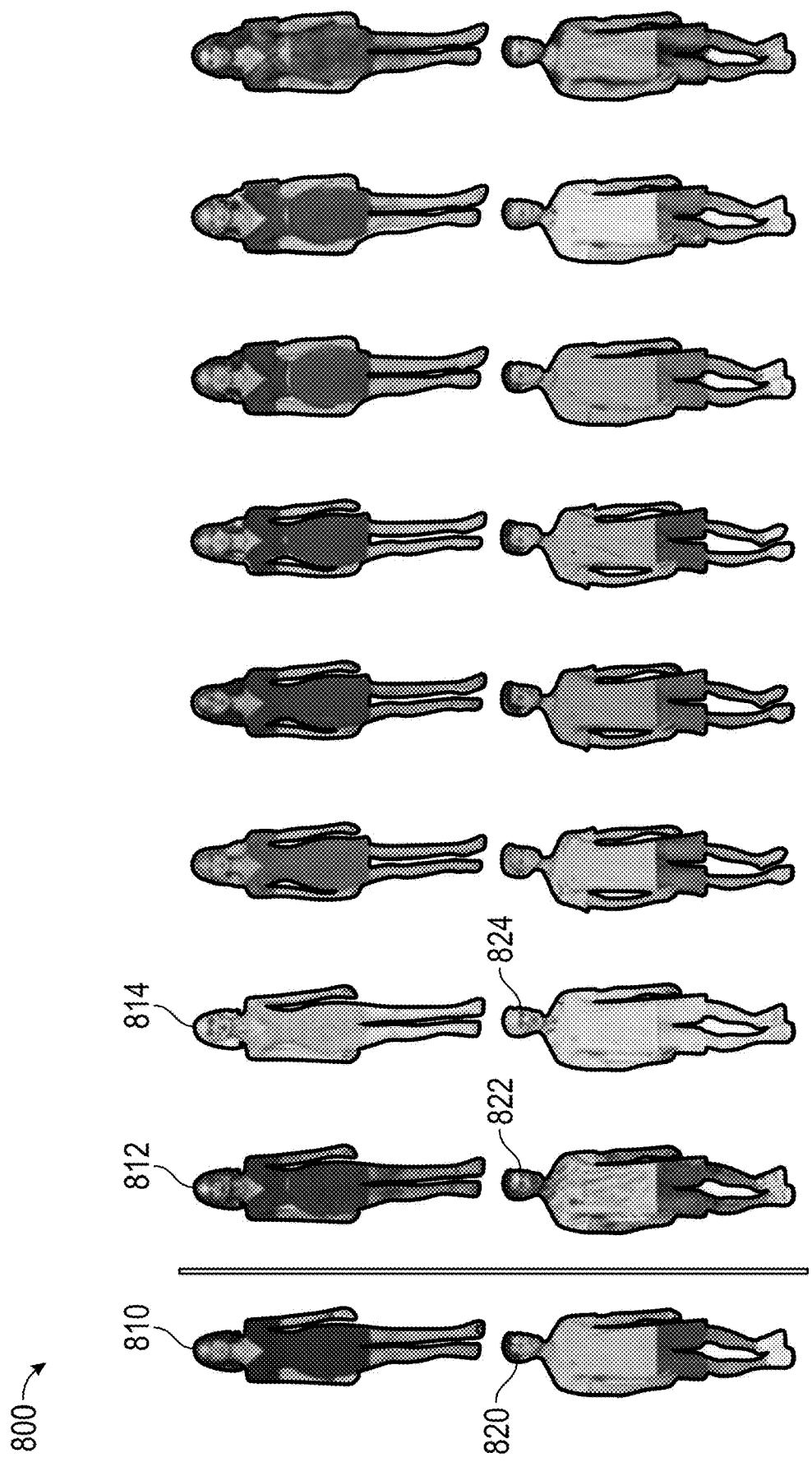
FIG. 8 is diagrammatic representations of outputs of the body stylizing system, in accordance with some examples.

FIG. 8 are diagrammatic representations of outputs 800 of the body stylizing system 224, in accordance with some examples. Specifically, an input image 810 can be received by the body stylizing system 224. The body stylizing system 224 processes the input image 810 by a first trained machine learning model implemented by the body stylizing module 514 to generate a first stylized version 812 of the body depicted in the input image 810 corresponding to a first style. In some cases, the input image 810 is processed by a second trained machine learning model implemented by the body stylizing module 514 to generate a second stylized version 814 of the body depicted in the input image 810 corresponding to a second style.

In some examples, a second input image 820 can be received by the body stylizing system 224. The body stylizing system 224 processes the input image 820 by the first trained machine learning model implemented by the body stylizing module 514 to generate a third stylized version 822 of the body depicted in the input image 820 corresponding to the first style. In some cases, the input image 820 is processed by the second trained machine learning model implemented by the body stylizing module 514 to generate a fourth stylized version 824 of the body depicted in the input image 820 corresponding to the second style.

Figure 9:
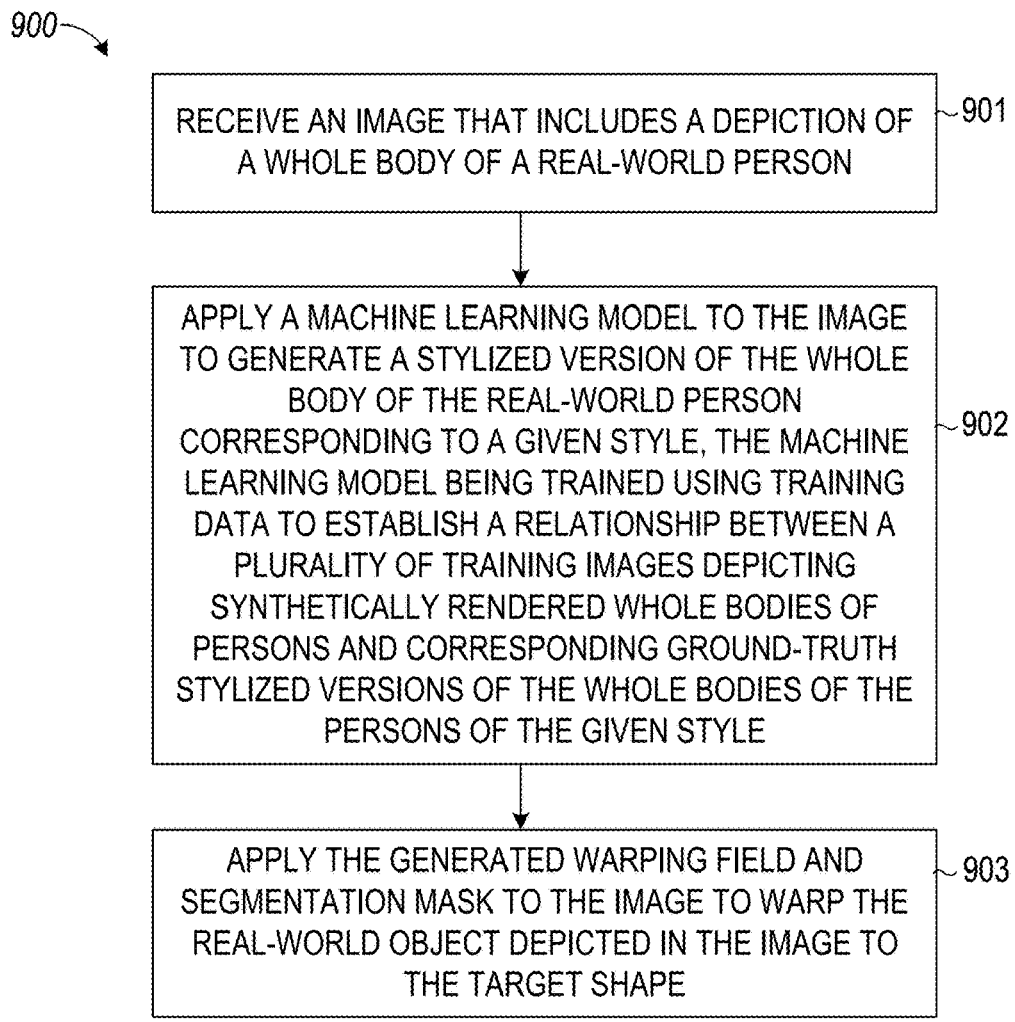
FIG. 9 is a flowchart illustrating example operations of the body stylizing system, according to some examples.

FIG. 9 is a flowchart of a process 900 performed by the body stylizing system 224, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the body stylizing system 224 (e.g., a client device 102 or a server) receives an image that includes a depiction of a whole body of a real-world person, as discussed above.

At operation 902, the body stylizing system 224 applies a machine learning model to the image to generate a stylized version of the whole body of the real-world person corresponding to a given style, the machine learning model being trained using training data to establish a relationship between a plurality of training images depicting synthetically rendered whole bodies of persons and corresponding ground-truth stylized versions of the whole bodies of the persons of the given style, as discussed above.

At operation 903, the body stylizing system 224 replaces the depiction of the whole body of the real-world person in the image with the generated stylized version of the whole body of the real-world person, as discussed above.

Machine Architecture

Figure 10:
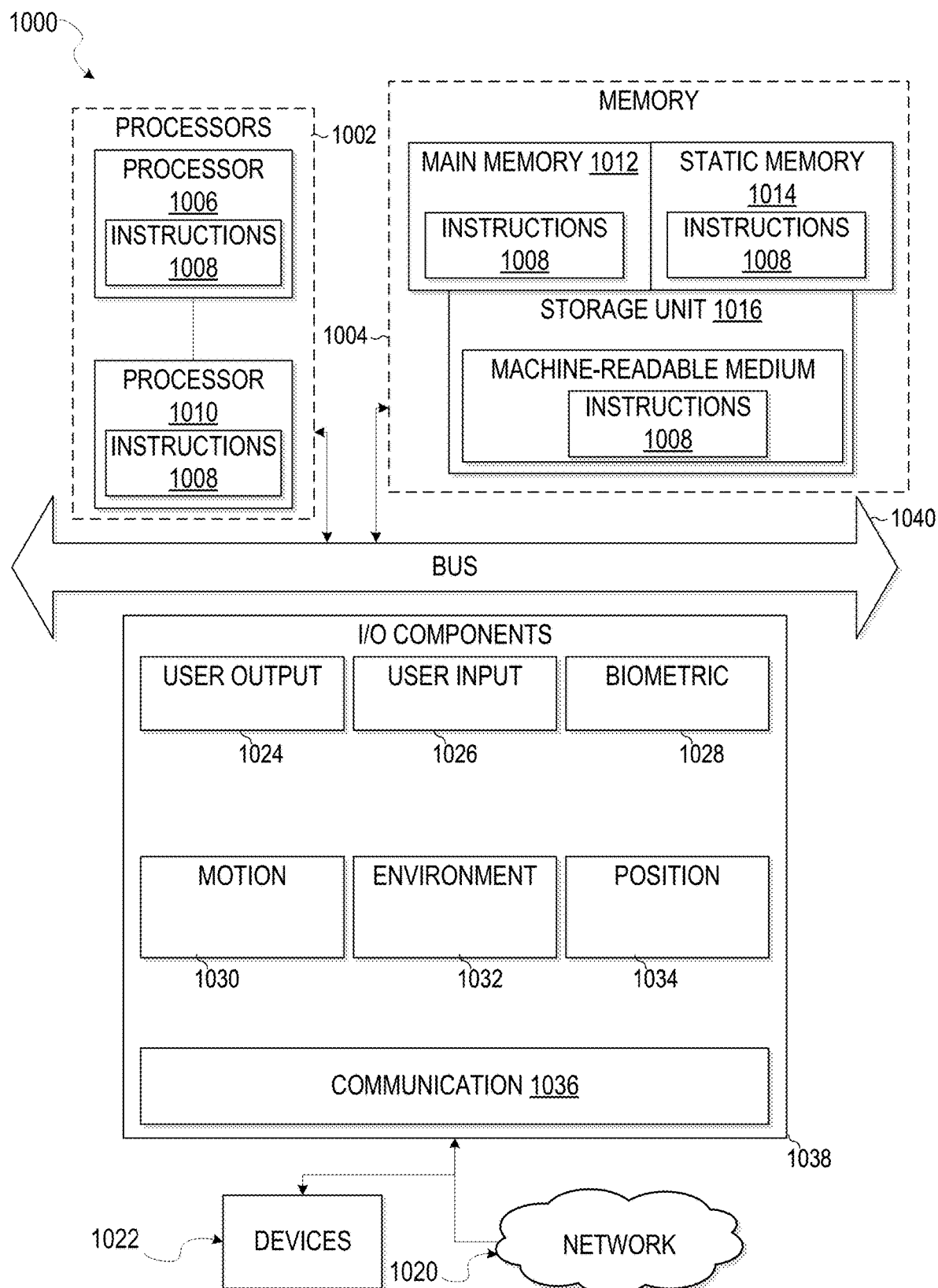
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
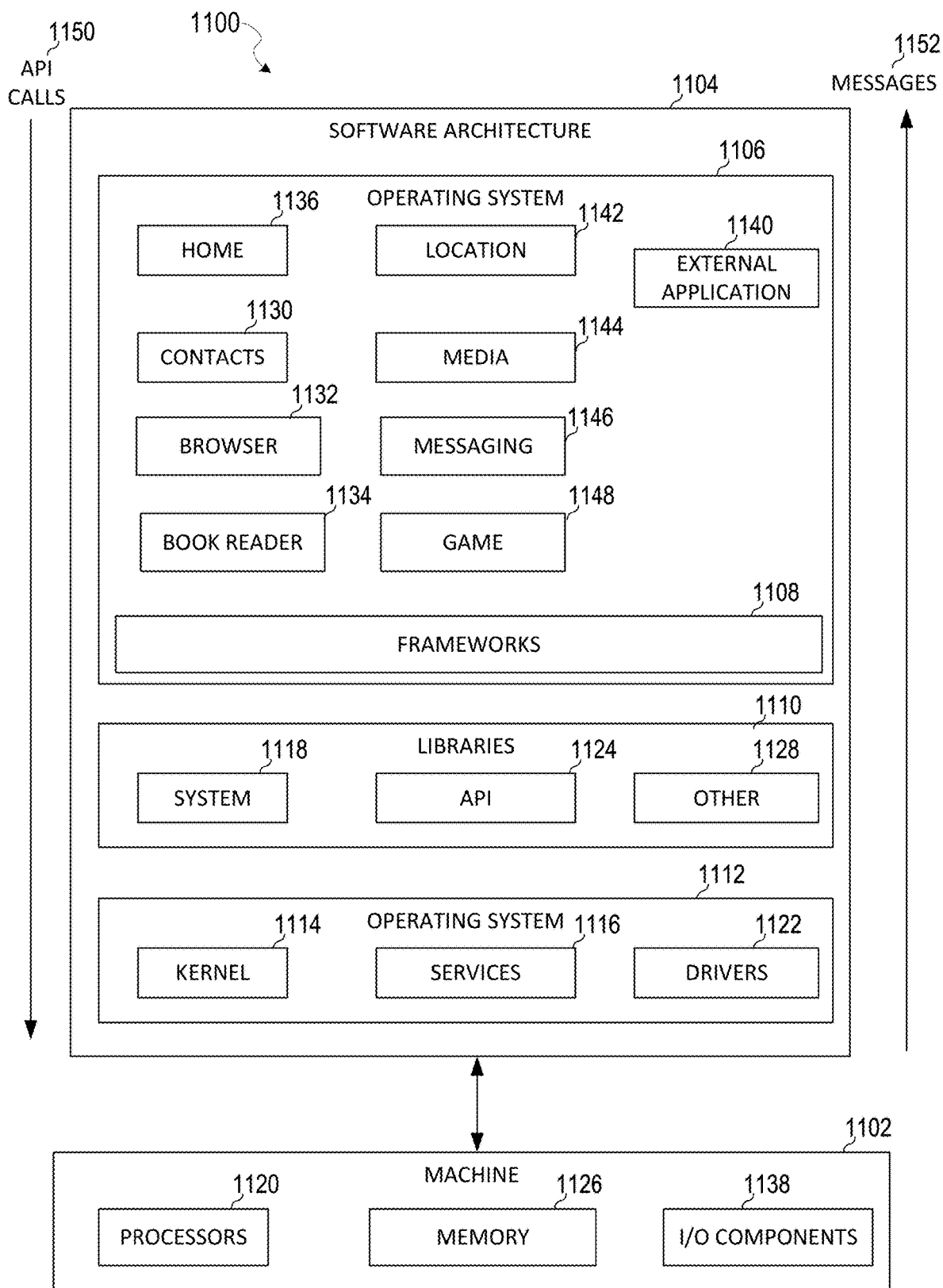
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistant (PDA), smartphone, tablet, ultrabook, netbook, laptop, multi-processor system, microprocessor-based or programmable consumer electronics, game console, set-top box, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    receiving, by one or more processors, an image that includes a depiction of a whole body of a real-world person;
    applying, by the one or more processors, a machine learning model to the image to generate a stylized version of the whole body of the real-world person corresponding to a given style;
    replacing the depiction of the whole body of the real-world person in the image with the generated stylized version of the whole body of the real-world person;
    wherein the machine learning model has been trained using paired training data to establish a relationship between a plurality of training images depicting synthetically rendered whole bodies of persons and corresponding target stylized versions of the whole bodies of the persons of the given style, the training comprising:
        generating the paired training data using first and second whole-body generative adversarial networks (GANs), wherein the first whole-body GAN generates the training images depicting synthetically rendered whole bodies of persons and the second whole-body GAN generates the corresponding target stylized versions;
        applying the machine learning model to a training image to generate an estimated stylized version of a whole body depicted in the training image;
        computing a deviation between the estimated stylized version and the corresponding target stylized version; and
        updating one or more parameters of the machine learning model based on the computed deviation.

2. The method of claim 1, wherein the whole body of the real-world person includes a head, arms, torso, and legs, and wherein the stylized version of the whole body of the real-world person includes a stylized version of the head, arms, torso, and legs.

3. The method of claim 1, wherein the machine learning model comprises a deep neural network.

4. The method of claim 1, wherein before applying the machine learning model to the image, the method comprises:
    receiving input that selects the given style from a plurality of styles; and
    selecting the machine learning model from a plurality of machine learning models each configured to generate a different stylized version of a whole body of a person corresponding to a respective one of the plurality of styles.

5. The method of claim 4, wherein the plurality of styles includes at least one of a zombie style, a body builder style, a cartoon style, anime, Gollum, neanderthal, or a barbie style.

6. The method of claim 1, further comprising generating the paired training data by performing operations comprising:
    accessing a first set of latent code, wherein the latent code comprises a vector of values that serves as input to the first and second whole-body GANs;
    rendering, by the first whole-body GAN, a first synthetic whole body of a person corresponding to the first set of latent code, wherein the first synthetic whole body represents an unstylized version of the person;
    rendering, by the second whole-body GAN, a second synthetic whole body of the person corresponding to the first set of latent code, wherein the second synthetic whole body represents a version of the person being transformed toward the given style;
    computing directional loss, by a directional loss model associated with the given style, based on the second synthetic whole body of the person, wherein the directional loss represents a measure of how closely the second synthetic whole body matches the given style;
    updating one or more weights of the second whole-body GAN based on the directional loss; and repeating the rendering of the second synthetic whole body of the person, the computing of the directional loss and the updating of the one or more weights until a stopping criterion is reached.

7. The method of claim 6, further comprising:
determining that the stopping criterion has been reached;
in response to determining that the stopping criterion has been reached, repeating the operations for a second set of latent code to further train the second whole-body GAN; and
after the second whole-body GAN has been trained using both the first and second sets of latent code, generating a pair of images of the training data by applying a new latent code, different from the first and second sets of latent code, to the first and second whole-body GANs to generate a first of the plurality of training images depicting synthetically rendered whole bodies of persons and a first of corresponding ground-truth stylized versions of the whole bodies of the persons.

8. The method of claim 7, further comprising:
training the machine learning model based on the pair of images of the training data.

9. The method of claim 7, further comprising:
accessing the first set of latent code by first and second face-based GANs, wherein the first and second face-based GANS are configured to generate synthetic faces of person;
rendering, by the first face-based GAN, a first synthetic face of the person corresponding to the first set of latent code, wherein the first synthetic face represents an unstylized version of the face of the person;
rendering, by the second face-based GAN, a second synthetic face of the person corresponding to the first set of latent code, wherein the second synthetic face represents a version of the face of the person being transformed toward the given style;
computing directional loss, by the directional loss model associated with the given style, based on the second synthetic face of the person, wherein the directional loss represents a measure of how closely the second synthetic face matches the given style;
updating one or more weights of the second face-based GAN based on the directional loss; and
repeating the rendering of the second synthetic face of the person, the computing of the directional loss and the updating of the one or more weights until the stopping criterion is reached again.

10. The method of claim 9, further comprising:
applying the new latent code to the first and second face-based GANs; and
generating a second pair of images of the training data based on an output of the first and second face-based GANs.

11. The method of claim 10, further comprising:
overlaying a synthetic face of the person generated by the second face-based GAN with the second synthetic whole body of the person of the pair of images generated by the second whole-body GAN;
fusing smoothly the second synthetic face of the person generated by the second face-based GAN with the second synthetic whole body of the person of the pair of images generated by the second whole-body GAN; and
storing, as the second synthetic whole body of the person of the pair of images, the second synthetic face of the person generated by the second face-based GAN which has been smoothly fused with the second synthetic whole body of the person of the pair of images generated by the second whole-body GAN.

12. The method of claim 6, further comprising:
selecting a portion of the second synthetic whole body of the person corresponding to a body part;
identifying a set of weights of the second GAN corresponding to the body part;
computing the directional loss, by the directional loss model associated with the given style, based on the selecting of the portion of the second synthetic whole body of the person corresponding to the body part; and
updating the set of weights corresponding to the body part without updating other weights associated with other body parts based on the direction loss.

13. The method of claim 12, further comprising:
dividing the second synthetic whole body of the person into individual portions corresponding to different body parts; and
computing the directional loss separately for each of the individual portions.

14. The method of claim 1, further comprising training the machine learning model by performing training operations comprising:
accessing the training data;
applying the machine learning model to a first set of the training data comprising a first training image of the plurality of training images depicting synthetically rendered whole bodies of persons to generate an estimated a stylized version of the whole body of the person depicted in the first training image;
computing a deviation between the estimated stylized version of the whole body of the person depicted in the first training image and the ground-truth stylized version of the whole body of the person depicted in the first training image; and
updating one or more parameters of the machine learning model based on the deviation between the estimated stylized version of the whole body of the person depicted in the first training image and the ground-truth stylized version of the whole body of the person depicted in the first training image.

15. The method of claim 14, further comprising:
generating whole body key points for the whole body of the person depicted in the first training image, wherein the estimated stylized version of the whole body of the person depicted in the first training image is generated based on the whole body key points.

16. The method of claim 1, wherein the image is received as a frame of a video depicting the real-world person, and wherein the depiction of the whole body of the real-world person in the video is replaced with the stylized version in real time.

17. A system comprising:
a processor; and
a memory component having instructions stored thereon that, when executed by the processor, cause the processor to perform operations comprising:
receiving an image that includes a depiction of a whole body of a real-world person;
applying a machine learning model to the image to generate a stylized version of the whole body of the real-world person corresponding to a given style; and
replacing the depiction of the whole body of the real-world person in the image with the generated stylized version of the whole body of the real-world person;
wherein the machine learning model has been trained using paired training data to establish a relationship between a plurality of training images depicting synthetically rendered whole bodies of persons and corresponding target stylized versions of the whole bodies of the persons of the given style, the training comprising:
generating the paired training data using first and second whole-body generative adversarial networks (GANs), wherein the first whole-body GAN generates the training images depicting synthetically rendered whole bodies of persons and the second whole-body GAN generates the corresponding target stylized versions;
applying the machine learning model to a training image to generate an estimated stylized version of a whole body depicted in the training image;
computing a deviation between the estimated stylized version and the corresponding target stylized version; and
updating one or more parameters of the machine learning model based on the computed deviation.

18. The system of claim 17, wherein the whole body of the real-world person includes a head, arms, torso, and legs, and wherein the stylized version of the whole body of the real-world person includes a stylized version of the head, arms, torso, and legs.

19. The system of claim 17, wherein the machine learning model comprises a deep neural network.

20. A non-transitory computer-readable storage medium having stored thereon instructions that, when executed by a processor, cause the processor to perform operations comprising:
receiving an image that includes a depiction of a whole body of a real-world person;
applying a machine learning model to the image to generate a stylized version of the whole body of the real-world person corresponding to a given style, the machine learning-model-being-trained using training data to establish a relationship between a plurality of training images depicting-synthetically rendered whole bodies of persons and corresponding ground truth stylized-versions of the whole bodies of the persons of the given style; and
replacing the depiction of the whole body of the real-world person in the image with the generated stylized version of the whole body of the real-world person;
wherein the machine learning model has been trained using paired training data to establish a relationship between a plurality of training images depicting synthetically rendered whole bodies of persons and corresponding target stylized versions of the whole bodies of the persons of the given style, the training comprising:
generating the paired training data using first and second generative adversarial networks (GANs), wherein the first GAN generates the training images depicting synthetically rendered whole bodies of persons and the second GAN generates the corresponding target stylized versions;
applying the machine learning model to a training image to generate an estimated stylized version of a whole body depicted in the training image;
computing a deviation between the estimated stylized version and the corresponding target stylized version; and
updating one or more parameters of the machine learning model based on the computed deviation.

* * * * *